M. TURLEY.
Horse-Collars.

No. 213,474. Patented Mar. 18, 1879.

WITNESSES
F. L. Ouraud
J. J. McCarthy

INVENTOR
Marshall Turley
By his Attorneys
Alexander Mason

UNITED STATES PATENT OFFICE.

MARSHALL TURLEY, OF COUNCIL BLUFFS, IOWA.

IMPROVEMENT IN HORSE-COLLARS.

Specification forming part of Letters Patent No. 213,474, dated March 18, 1879; application filed September 25, 1878.

*To all whom it may concern:*

Be it known that I, MARSHALL TURLEY, of Council Bluffs, in the county of Pottawattamie, and in the State of Iowa, have invented certain new and useful Improvements in Horse-Collars; and do hereby declare that the following is a full, clear, and exact description thereof, reference being had to the accompanying drawings, and to the letters of reference marked thereon, making a part of this specification.

The nature of my invention consists in the construction and arrangement of a horse-collar, as will be hereinafter more fully set forth.

In order to enable others skilled in the art to which my invention appertains to make and use the same, I will now proceed to describe its construction and operation, referring to the annexed drawings, in which—

Figure 1:
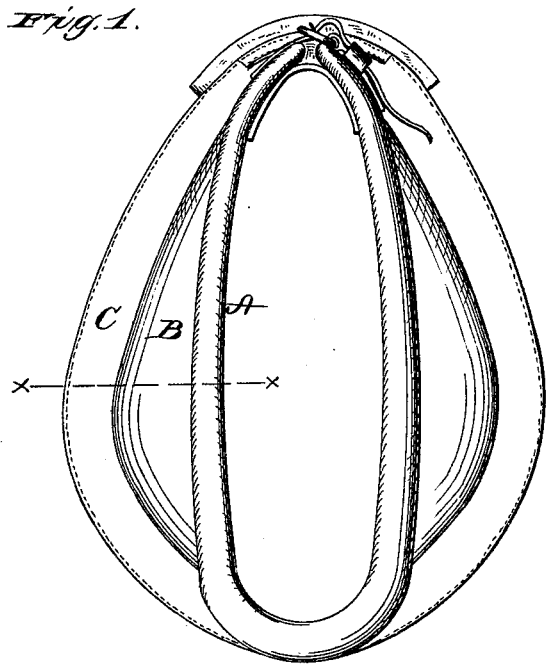
Figure 2:
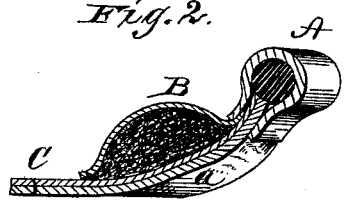

Figure 1 is a front view of my improved horse-collar. Fig. 2 is a detailed section through the line $x\ x$, Fig. 1.

A represents the rim of the collar, and B B the pads, made of any suitable size. The collar may be made open at the top only, as shown in the drawings, or both at top and bottom, if desired.

C represents a flexible flange, forming part of the collar and extending a suitable distance around the collar, so that it will yield to the motion of the horse and avoid friction, thereby allowing the horse to travel with more ease.

Ordinarily horse-collars are made stiff on the outer edge, and will not yield, thereby producing friction, which is entirely obviated by the projecting flexible flange C.

The collar is stuffed, so as to keep the belly or pads flat, as shown at $a$, thereby giving a great bearing on the shoulders, to prevent rolling and friction.

Generally horse-collars are made to have a round belly, which gives a rolling motion, thereby wrinkling up the skin and hurting the horse.

In my collar the pad or stuffing is on the front of the collar, so as not to swell the belly of the collar.

The belly $a$ of the collar may be made of single or double ply leather, or of any other suitable material.

Having thus fully described my invention, what I claim as new, and desire to secure by Letters Patent, is—

1. In a horse-collar, the flexible flange C around the edge of the collar, and forming a part thereof, for the purposes herein set forth.

2. A horse-collar constructed with a flat belly, and the pad or stuffing on the front of the collar, as and for the purposes herein set forth.

In testimony that I claim the foregoing I have hereunto set my hand this 10th day of August, 1878.

MARSHALL TURLEY.

Witnesses:
JOHN LINDT,
W. F. HENDRICKS.